US008583362B2

(12) United States Patent
Nagase et al.

(10) Patent No.: US 8,583,362 B2
(45) Date of Patent: Nov. 12, 2013

(54) APPARATUS, METHOD, AND PROGRAM FOR GENERATING ROAD INFORMATION

(75) Inventors: Kenji Nagase, Okazaki Aichi (JP); Kensaku Fujitani, Aichi (JP)

(73) Assignee: Aisin AW Co, Ltd., Anjo (JP)

( * ) Notice: Subject to any disclaimer, the term of this patent is extended or adjusted under 35 U.S.C. 154(b) by 1235 days.

(21) Appl. No.: 12/081,954

(22) Filed: Apr. 24, 2008

(65) Prior Publication Data

US 2008/0270014 A1 Oct. 30, 2008

(30) Foreign Application Priority Data

Apr. 25, 2007 (JP) ................................ 2007-116262

(51) Int. Cl.
*G06F 19/00* (2011.01)

(52) U.S. Cl.
USPC .......................................... 701/414; 701/415

(58) Field of Classification Search
USPC ................................. 701/117–119, 210–213
See application file for complete search history.

(56) References Cited

U.S. PATENT DOCUMENTS 6,321,161 B1 * 11/2001 Herbst et al. .................. 701/210
7,062,380 B2 6/2006 Oonishi et al. ................ 701/210
2003/0060977 A1 * 3/2003 Jijina et al. ..................... 701/210
2003/0069683 A1 4/2003 Lapidot et al. ................ 701/117
2005/0096840 A1 5/2005 Simske ......................... 701/202
2005/0187714 A1 * 8/2005 Brulle-Drews ................... 702/3
2005/0222762 A1 * 10/2005 Hamilton et al. ............. 701/210
2005/0222763 A1 10/2005 Uyeki ........................... 701/210
2006/0029847 A1 2/2006 Yumita et al. ................... 429/23
2006/0058940 A1 * 3/2006 Kumagai et al. .............. 701/117
2006/0074551 A1 * 4/2006 Zaitsu et al. .................. 701/209
2006/0178807 A1 8/2006 Kato et al. .................... 701/117
2007/0106465 A1 5/2007 Adam et al. .................. 701/209
2007/0198176 A1 * 8/2007 Endo et al. .................... 701/208

FOREIGN PATENT DOCUMENTS

JP H10-082644 A 3/1998
JP 2000-193471 7/2000
JP 2005-284588 10/2005
JP 2006-017607 1/2006

* cited by examiner

*Primary Examiner* — Kira Nguyen
(74) *Attorney, Agent, or Firm* — Bacon & Thomas, PLLC

(57) ABSTRACT

History information for the history of vehicle travel on a road is obtained. Traffic-volume information indicating a traffic volume on the road is obtained based on the history information that has been stored in at least a predetermined amount. When the traffic volume on the road during a predetermined period is smaller than a predetermined reference value indicating a difficulty of passage, road-selection information for avoiding that road is generated.

15 Claims, 3 Drawing Sheets

APPARATUS, METHOD, AND PROGRAM FOR GENERATING ROAD INFORMATION

INCORPORATION BY REFERENCE

The disclosure of Japanese Patent Application No. 2007-116262 filed on Apr. 25, 2007, including the specification, drawings and abstract thereof, is incorporated herein by reference in its entirety.

BACKGROUND OF THE INVENTION

1. Field of the Invention

The present invention relates to an apparatus, a method, and a program for generating road information that can be used for route guidance of vehicles.

2. Description of the Related Art

Guidance along recommended routes to avoid traffic congestion is disclosed, for example, in Japanese Unexamined Patent Application Publication No. 2000-193471. In the disclosed system, where need for a detour around congestion is indicated, the cost of links to be detoured is increased in searching for a route.

SUMMARY OF THE INVENTION

In the above-mentioned system of the related art, the alternative route (i.e., detour route) presented for avoiding congestion may be a road that is difficult to pass. In that system, link costs are preset, with the costs of congested roads and closed roads increased, to reduce the possibility that a congested road and/or closed road might be selected during route searching to select an alternative route. Since only congestion and closing of roads to be detoured are considered in such a system, even a road that is difficult to travel will be included among possible alternative routes. For example, roads such as a mountain road in wintertime or a road accessing a crowded shopping street, may be included as possible alternative routes. The present invention has been made in view of the foregoing problem, and an object of the present invention is to provide information for avoiding such a road that is difficult to pass.

In order to achieve the foregoing object, the present invention stores at least a predetermined amount of information for history of vehicle travel on a road and traffic-volume information is obtained based on the history information. Further, when the traffic volume of a road during a predetermined time period is smaller than a predetermined reference value, indicating a difficulty of passage, road-selection information for avoiding that road is generated. Thus, according to the present invention, a road whose traffic volume during the predetermined time period is small is assumed to be a road for which the lower volume of traffic is due to its difficulty of passage as compared to other roads, and road-selection information for avoiding the road is generated. Therefore, it is possible to provide road-selection information for avoiding a road that is difficult to pass so that the user of the road-selection information can avoid that road, i.e. the route search or route guidance is executed using the road selection information.

According to the present invention, when at least a predetermined amount of history information has been stored for a given road, the traffic volume on that road is evaluated. Thus, the difficulty of passage is assumed based on the traffic volume. Typically, where the traffic volume of a first road is large and the traffic volume of a second road is small, the difference is likely to be caused by the difficulty of travel on the second road. Accordingly, the amount of history information stored to an extent that the difficulty of passage will be evidenced by the traffic volume, i.e. the predetermined amount of history information, and the traffic volume associated with a difficulty of passage (travel) is pre-defined as the reference value. Based on the history information that has been stored in at least the predetermined amount, a determination is made as to whether not the traffic volume is smaller than the reference value. This makes it possible to determine that a road is difficult to pass and also to generate the road-selection information for avoiding that road.

The history-information obtaining means obtains the history information as a vehicle actually travels a road, and that history information may include information indicating the travel of the vehicle on that road, information indicating the speed of the vehicle, information as to the time of day, etc., all of which is associated with the location of the road. While, for example, probe information may be used as the history information, the method for collecting the history information is not particularly limited. For example, an optical beacon, an ultrasonic vehicle sensor, a loop-coil vehicle sensor, or the like may be used to obtain, as the history information, the information for travel of the vehicle on a road. Alternatively, information indicating travel history may be collected from a plurality of vehicles as the history information.

Obtaining the history information may be implemented by various types of communication, such as wireless communication or cable communication. Further, travel information recorded in a storage medium may be either automatically or manually collected for use as the history information. It is preferred that the obtained history information be written into and stored in a storage medium that can be referred to (accessed) by the road-information generating apparatus. The traffic-volume-information obtaining means can obtain the traffic-volume information indicating the traffic volume of a road based on the history information that has been stored in at least the predetermined amount, and can determine the number of vehicles that traveled through the road per unit time. The predetermined amount for defining the minimum amount of history information may be defined in various manners. For example, the predetermined amount may be the amount of information allowing the difficulty of passage to be expressed by traffic volume, it may be defined for each period of time and/or for each map (geographic) zone or map grid unit, or it may be defined according to the number of roads in a zone.

Thus, the road-selection information generating means can identify a road that is assumed to be difficult to pass, based on the traffic volume during a predetermined time period, and can generate road-selection information for avoiding that road. The predetermined time period may be predetermined in accordance with a road condition to be avoided. For example, when the difficulty of passing a road varies depending on a period of time, the aforementioned predetermined period may be set in accordance with the difficulty of passage, or when the number of pedestrians on a road varies depending on the time, the predetermined time period may be determined in accordance with a variation in the number of pedestrians. As used herein “time” and “period of time” mean time of day, day of the week and/or a holiday.

In order to identify a road that is assumed to be difficult to pass based on the traffic volume, a traffic volume that is small enough to allow an assumption that the road is difficult to pass is predetermined as a predetermined reference value. In this case, the predetermined reference value for the traffic volume serves as a threshold for determining whether or not the road is difficult to pass, and may be a fixed value or a value which varies according to the above-mentioned time period or map zone.

The road-selection information for avoiding a road may be either information directly indicating the road is to be avoided or information for reducing the possibility that the road will be included in routes selected by route search. An example of the latter case is information indicating costs individually assigned to various roads and for use in route searching. That is, when the road traffic volume is smaller than the predetermined reference value indicating difficulty of passage, the cost associated with a link for that road is increased. With this system, since the possibility that such a road will be included among the routes selected by route searching is reduced, the information indicating the cost serves as the road-selection information for avoiding the road. When the cost of a link is increased, the cost may be set higher than a cost previously set for the link or may be set higher than the costs of neighboring roads.

As noted above, at least a predetermined amount of stored history information for a specific map zone may be utilized in the present invention. In such an embodiment, the road traffic volume is determined based on at least the predetermined amount of the history information that has been stored for multiple roads included in a zone preset on a map. With this arrangement, when the amount of stored history information for the multiple roads included in the zone exceeds the predetermined amount, the traffic-volume information is obtained. A determination is then made as to whether or not the traffic volume of the multiple roads included in the zone is smaller than the predetermined reference value indicating difficulty of passage and, if smaller, the road-selection information is then generated. With this arrangement, it is possible to reliably evaluate the difficulty of passing over roads included in each zone.

A map zone may be set in various manners, as long as the zone includes, at least, a first road and a second road that serves as a candidate for detouring the first road. For example, a zone that is referred to as a grid unit for use in a typical navigation apparatus may be used as the zone in the present invention. However, “zone”, as used herein, is not limited to a map grid unit, and may be a prefecture, a municipal division, or the like.

It is sufficient that the predetermined amount specified for the history information be set so that the difficulty of passing through a road can be determined based on the traffic volume. Thus, whether or not the history information has been stored in at least the predetermined amount, i.e. in an amount whereby the difficulty of passing (traversing) a road can be determined based on the traffic volume, may be either directly or indirectly determined.

A rate of change in the amount of the stored history information for multiple roads included in a map zone may also be utilized. That is, when obtaining of the history information is started and executed continuously, the rate (percentage) of change varies in accordance with the amount of the stored history information, i.e. as the amount of the stored history information increases, the rate of change decreases. Thus, determination as to whether or not the rate of change in the amount of the stored history information is lower than a predetermined rate is an indirect determination of whether or not at least the predetermined amount of history information has been accumulated and stored.

Accordingly, when the change in the amount of stored history information relative to time has become smaller than a predetermined rate, the traffic-volume information is generated and a determination as to whether or not the traffic volume is smaller than the predetermined reference value is made with respect to roads included in the zone. As a result, it is possible to reliably evaluate the difficulty of passing through the roads included in each zone. The zone in this case may also be set in the various manners described above. The rate of change in the amount of the stored history information may be a ratio of a numerator and a denominator that represent amounts of stored history information. For example, the rate of change may be defined as the ratio of an amount of stored history information during an immediately preceding predetermined time period to the total amount of stored history information for a given road (this ratio will hereinafter be referred to as a “first ratio”). Alternatively, the amounts of stored history information in respective predetermined time periods may be aggregated and the ratio of the amount of stored history information obtained and stored during one predetermined time period to the amount of stored history information obtained and stored during a subsequent predetermined time period (this ratio will hereinafter be referred to as a “second ratio”) may be taken as the rate of change.

In the first ratio, the total amount of stored history information, the total amount serving as a denominator, increases as the history information is continuously accumulated and stored. Thus, when at least the predetermined amount of history information stored is taken to be when the ratio of the amount of history information stored during a certain period to the total amount of history information reaches a predetermined reference value or less.

The second ratio is an indicator that utilizes the penetration rate of history-information providing apparatuses (e.g., navigation apparatuses). That is, the absolute number of history-information providing apparatuses is small in an initial stage of their penetration. In a stage of rapid penetration, however, when the amount of stored history information during a certain predetermined period and the amount of history information stored during a next predetermined period are compared with each other, the amount of history information stored during the next predetermined period becomes larger than the amount of history information stored during the certain period. On the other hand, when the proliferation of the history-information providing apparatuses is completed and the absolute number of history-information providing apparatuses has become large, the amount of history information stored during the certain period and the amount of history information stored during the next predetermined period become almost equal to each other. That is, the rate of change defined as the ratio of the amount of history information stored during a certain period to the amount of history information stored during the next predetermined period converge to a specific value. Thus, a reference value may be preset for the rate of change in the ratio of the amount of history information stored in a certain predetermined period to the amount of history information stored in the next predetermined period. With this method, making a determination as to whether or not the rate of change is smaller than the predetermined reference value is an indirect determination of whether or not the proliferation of the history-information providing apparatuses is completed and the history information has been stored in at least the predetermined amount.

Methods for indirectly determining whether or not at least the predetermined amount of the history information has been stored are not limited to the above-described techniques. For example, the navigation apparatuses installed in the vehicles may obtain residence information indicating locations set for homes of the drivers of the vehicles. In this method, when the number of homes located in a zone preset on a map exceeds a predetermined reference number or when the change in the number of locations set for homes, the number of locations being aggregated at predetermined intervals, is smaller than a predetermined reference number, generation of the road-selection information for roads included in the zone may commence based on the assumption that at least the predetermined amount of history information has been accumulated and stored. Alternatively, with respect to roads included in a preset map zone, when the ratio of the number of links associated with the history information to the number of all links in that zone exceeds a predetermined reference value or the amount of change in the ratio relative to time is smaller than a predetermined reference value, road-selection information regarding roads included in the zone may be generated based on the assumption that at least the predetermined amount of history information has been stored.

In addition, the determination of whether or not the traffic volume is smaller than the predetermined reference value, indicating the difficulty of passage, may be executed for each season in order to evaluate the traffic volume. In this manner, in accordance with the difficulty of travel of a road which varies seasonally, it is possible to generate road-selection information for avoidance of a seasonally congested road. For example, it is thereby possible to avoid a mountain road in wintertime.

Additionally, since it takes time to collect and store the predetermined amount of history information for a newly opened road, traffic-volume information is not obtained until significant information about the newly opened road is first obtained. That is, the road-opening information is obtained and, when a predetermined period has passed after the opening of a road, the road-selection information is generated for the new road. This arrangement can prevent avoiding a road which lacks the predetermined amount of history information only because the road has been opened just recently. However, a newly opened road may become a road to be avoided upon accumulation of the predetermined amount of history information.

The road-information generating apparatus is typically located at an information center that collects a large amount of information from a large number of areas and that processes that information, but it may be installed in a vehicle. According to the present invention, the road-selection information generated by the information center may be used by a navigation apparatus installed in a vehicle.

For example, the road-information generating apparatus may include transmitting means for transmitting the road selection information whereby the navigation apparatus installed in the vehicle obtains the road-selection information transmitted from the road-information generating apparatus at an information center. In this case, travel-plan route information for a travel-plan route avoiding a road whose traffic volume during the predetermined period is smaller than the predetermined reference value, indicating the difficulty of passage, is obtained based on the road-selection information. In this manner, it is possible for the vehicle to avoid a road whose traffic volume during the predetermined period is smaller than the predetermined reference value.

According to the present invention, the scheme for generating the road-selection information for a road that is assumed to be difficult to pass, based on the traffic volume during the predetermined period, can be implemented as a program or a method. The road-information generating apparatus, a program, and a method according to the present invention may be realized in various manners. For example, the present invention may be in the form of an independent road-information generating apparatus or in the form of an apparatus sharing a component or components with an apparatus for generating or analyzing other information. The present invention can also provide a system, a method, and a program for an arrangement in which the road-information generating apparatus provided at an information center (remote location) and the navigation apparatus installed in a vehicle cooperate with each other. Various changes and modifications are also possible. For example, part of the system, the method, and the program may be achieved by software and part by hardware. The present invention can also be implemented as a storage medium encoded with a program for controlling the road-information generating apparatus. The storage medium for the software may be a magnetic storage medium or a magneto-optical storage medium or may be any storage medium to be developed in the future.

DESCRIPTION OF THE PREFERRED EMBODIMENTS

Embodiments of the present invention are described below in the flowing sequence:

(1) Configuration of the Road-Information Generating System (1-1) Configuration of the Road-Information Generating Apparatus (1-2) Configuration of the Navigation Apparatus (2) The Road-Information Generation Method (3) Operation of the Navigation Apparatus (4) Other Embodiments

Figure 1:
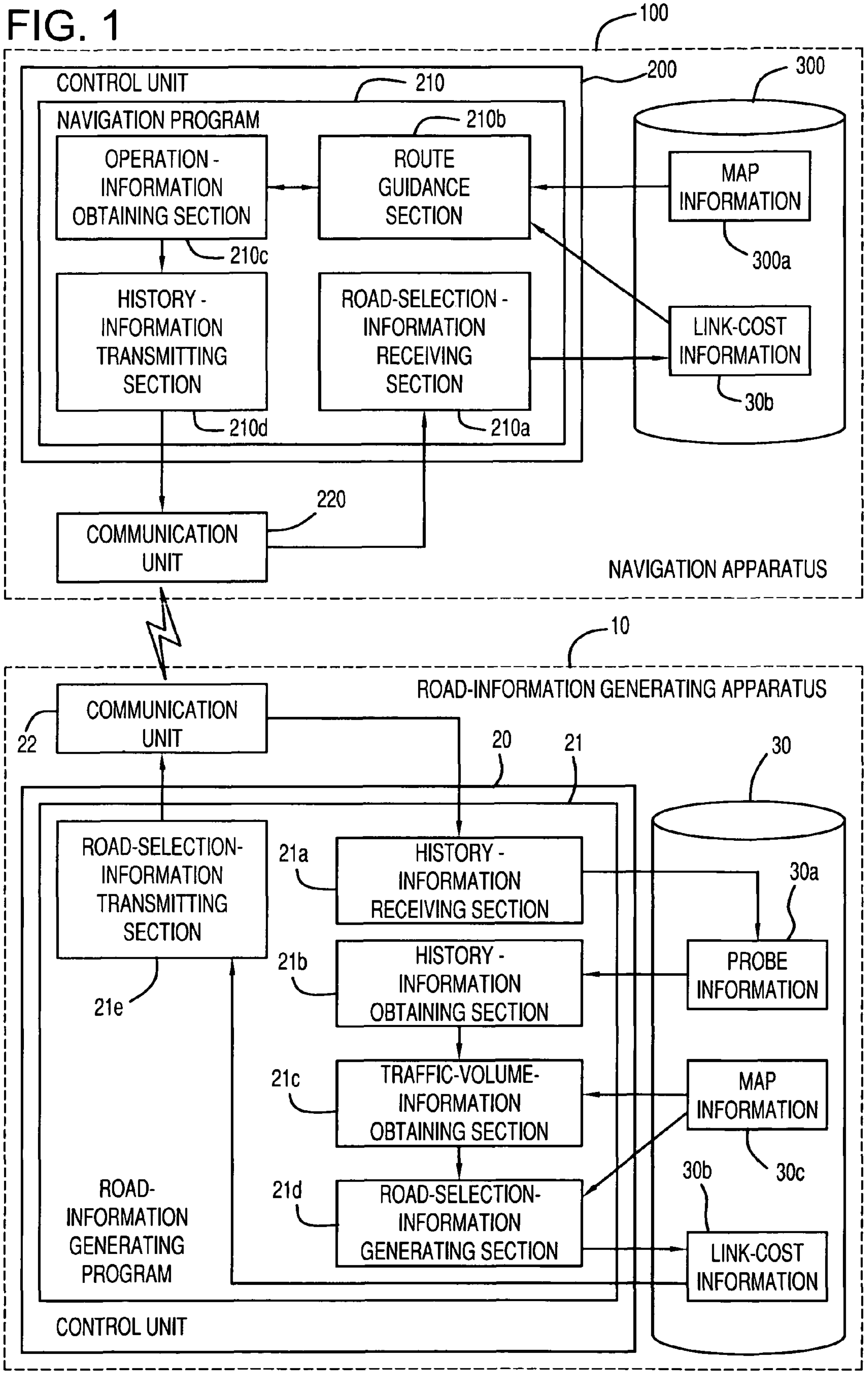
FIG. 1 is a block diagram of an embodiment of a system including a road-information generating apparatus at a remote location (information center) and a navigation apparatus mounted in a vehicle.

(1) Configuration of the Road-Information Generating System (1-1) Configuration of Road-Information Generating Apparatus FIG. 1 is a block diagram of a system including a road-information generating apparatus 10 located at a road-information management center and a navigation apparatus 100 installed in a vehicle. The road-information generating apparatus 10 includes a control unit 20 and a storage medium 30. The control unit 20 has a CPU, a RAM, a ROM, and so on for execution of programs stored in the storage medium 30 and/or the ROM. In the present embodiment, the control unit 20 can execute a road-information generating program 21, which is one of the stored programs, to generate road-selection information. A communication unit 22 has a circuit for communicating with the navigation apparatus 100 installed in the vehicle, so that the control unit 20 can transmit/receive various types of information via the communication unit 22.

The control unit 20, programmed with road-information generating program 21, generates road-selection information, and includes a history-information receiving section (means) 21*a*, a history-information obtaining section (means) 21*b*, a traffic-volume-information obtaining section (means) 21*c*, a road-selection-information generating section (means) 21*d*, and a road-selection-information transmitting section (means) 21*e*. By operating of the communication unit 22, the storage medium 30, and the RAM in the control unit 20, execution of the road-information generating program 21 provides the functions of generating and supplying the road-selection information.

History information in the present embodiment includes probe information for each link in a link set for each road. That is, each road is represented by data indicating nodes and links (road sections between (connecting) the nodes), and the probe information is information for each link indicating link speed, an amount of time required to travel (traverse) the link, and time (of day, day of week, etc.) when the vehicle traveled through the link. In the probe information in the present embodiment, the speed of the vehicle and time during travel of the vehicle are associated with the location of a road. In the present embodiment, the navigation apparatus 100, which is described below, stores road-opening information in a storage medium 300, also described below. The opening information indicates that links correspond to a newly opened road and also indicates the date when the road was opened. The navigation apparatus 100 transmits the opening information, together with the probe information, to the road-information generating apparatus 10 through communication described below. The road-selection information in the present embodiment indicates a cost associated with each link and is set so that, as the cost increases, the link is less likely to be included in routes found (selected) during the route search.

The history-information receiving section 21*a* is a module for receiving the probe information indicating history of the vehicle travel on a road corresponding to a link. Thus, by controlling the communication unit 22, the history-information receiving section 21*a* communicates with the vehicle and receives the probe information transmitted from the vehicle. The history-information receiving section 21*a* stores the received probe information (i.e., probe information 30*a* shown in FIG. 1) in the storage medium 30. Map information 30*c* including node information, link information, and link-cost information associated with the links is written in the storage medium 30, and the probe information is correlated (associated) with the links defined by the map information 30*c*.

The history-information obtaining section 21*b* is a module for obtaining the stored probe information 30*a*. In the present embodiment, the history-information obtaining section 21*b* obtains the probe information for each grid unit that serves as a unit for setting link costs. That is, the history-information obtaining section 21*b* extracts and obtains the probe information for multiple links included in each grid unit from the storage medium 30.

The traffic-volume-information obtaining section 21*c* is a module for obtaining the traffic-volume information for each link. When the amount of probe information that corresponds to a given grid unit, obtained by the history-information obtaining section 21*b* has become greater than or equal to the predetermined amount, the traffic-volume-information obtaining section 21*c* obtains the traffic-volume information indicating a vehicle-traffic volume for each link (i.e., the number of vehicles that traveled through each link per unit time). Since information indicating the travel speed of a vehicle for each link is recorded as part of the probe information, the traffic-volume-information obtaining section 21*c* obtains the traffic volume of each link based on the number of items of recorded information.

The predetermined amount set for the probe information is an amount of information preset so that when the traffic volume of a first link is large and the traffic volume of a second link is small, it can be assumed that the second link is more difficult to pass through. In the present embodiment, the road-opening information for a link is transmitted together with the probe information, as described above, and the traffic-volume-information obtaining section 21*c* references the opening information. Thus, until a predetermined period (e.g., six months) has passed after the opening of a road, the traffic-volume-information obtaining section 21*c* does not obtain the traffic-volume information for a link corresponding to the new road because, prior to that time, it is difficult to make a determination as to the difficulty of passage based on the traffic volume. That is, since it takes time to store history information for a newly opened road, the traffic-volume-information obtaining section 21*c* does not obtain the traffic-volume information until significant information for the newly opened road is accumulated and thus does not execute generation of the road-selection information until then. This arrangement can prevent avoiding a road for which the predetermined amount of history information has not yet been accumulated in storage merely because the road has been opened just recently. If the accumulated history information for a newly opened road later characterizes it as a road to be avoided, then it will be avoided in route selection by the route search.

The road-selection-information generating section 21*d* is a module for obtaining traffic volume during a predetermined period of time and for determining a link cost by comparing that obtained traffic volume with a predetermined reference value. That is, in the present embodiment, for a link whose traffic volume is smaller than the predetermined reference value, the road-selection-information generating section 21*d* generates the road-selection information based on an assumption that a link having a traffic volume smaller than the reference value is difficult to pass through and increases the link cost for that link to a value higher than the cost previously assigned to the link, thus reducing the possibility that the link will be included in routes selected by route search. The new link cost is then written into the storage medium 30 as the link-cost information 30*b* for that link.

The predetermined reference value for the traffic volume serves as a threshold for determining whether or not it is difficult to pass through a road, and may be a fixed value or a variable value according to the above-mentioned period of time or zone. For example, the reference value for the traffic volume may be a ratio, such as one vehicle per predetermined period or multiple vehicles per predetermined period. In addition, in the link-cost information 30*b*, to reduce the possibility that a link will be included in a selected route, it is sufficient to increase the cost of the link, and the amount of increase in the cost can be set as required.

For example, for an impassable link, the cost can be increased so much that the possibility of the link being included in routes found (selected) by route search becomes essentially zero, while for a link that is passable but is difficult to travel, the cost is increased by a smaller amount. In such a manner, the amount or range of the cost increase may be set according to a degree of need to avoid a link. The range of cost increase may also be set based on the traffic volume, in such a manner that the range for the cost increase is increased as the traffic volume decreases. As described above, when it is determined that a predetermined period (e.g., six months) has not passed after the opening of a road, there is no processing for changing link cost for a link(s) corresponding to the newly opened road.

The road-selection-information transmitting section 21*e* is a module for execution of processing for transmitting the link-cost information 30*b* to the vehicle. That is, by controlling the communication unit 22, the road-selection-information transmitting section 21*e* communicates with the vehicle and transmits the link-cost information 30*b* in response to a request from the vehicle.

(1-2) Configuration of Navigation Apparatus

The navigation apparatus 100, installed in a vehicle, includes a control unit 200 and a storage medium 300. The control unit 200 has a CPU, a RAM, a ROM, and so on. The control unit 200 can execute programs stored in the storage medium 300 and/or the ROM. In the present embodiment, the control unit 200 can execute a navigation program 210, one of the stored programs, to generate road-selection information. A communication unit 220 has a circuit for communicating with the road-information generating apparatus 10, so that the control unit 200 can transmit/receive various types of information via the communication unit 220.

The control unit 200, as programmed with navigation program 210, includes a road-selection-information receiving section (means) 210*a* and a route guidance section (means) 210*b* to obtain the link-cost information 30*b*, as a component of the road-selection information and to use that obtained link-cost information 30*b* in executing a route search. The control unit 200 further includes an operation-information obtaining section (means) 210*c* and a history-information transmitting section (means) 210*d* to supply the probe information, which serves as the history information, to the road-information generating apparatus 10. The storage medium 300 in which map information 300*a* and the link-cost information 30*b* are stored, and the communication unit 220 cooperate with each other to provide a route guidance function using the road-selection information.

The road-selection-information receiving section (means) 210*a* is a module for execution of processing for receiving the link-cost information 30*b*. That is, by controlling the communication unit 220, the road-selection-information receiving section 210*a* communicates with the road-information generating apparatus 10 and receives the link-cost information 30*b* transmitted from the road-information generating apparatus 10. The road-selection-information receiving section 210*a* stores the received link-cost information 30*b* in the storage medium 300. The map information 300*a* includes node information for each road and link information for connections between the nodes, and link-cost information pre-associated (correlated) with each link. When the road-selection-information receiving section 210*a* receives the link-cost information 30*b*, the existing link-cost information is updated with the latest received link-cost information 30*b*.

The route guidance section (means) 210*b* is a module for specifying the current location of the vehicle in which the navigation apparatus 100 is installed, based on the map information 300*a* and speed-sensor output information obtained by the operation-information obtaining section 210*c*, for searching for a route to a destination based on the link-cost information 30*b*, and for providing guidance to assist a driver in following the selected ("recommended" or "found") route.

For example, Dijkstra's algorithm, A* algorithm, or a modification thereof is used to search for a route from the current vehicle location to a destination, based on the existing link-cost information included in the map information 300*a* and the link-cost information 30*b* received as described above, and generates travel plan route information. After the route search, the navigation apparatus 100 outputs guidance, for a next portion to the selected route to be driven, through a display and/or a speaker (not shown), while showing the current vehicle location.

In the present embodiment, since the link-cost information 30*b*, in addition to the existing link-cost information included in the map information 300*a*, is used in the route search, the route search can be performed in a manner avoiding a road that is assumed to be difficult to pass through due to a small traffic volume. That is, in the above-described route-search algorithm, a link having a low cost set as the link cost information is more likely to be included in routes considered by the route search than a link having a high link cost. Thus, there is a high probability that a link having a traffic volume that is smaller than the predetermined reference value can be avoided.

The operation-information obtaining section (means) 210*c* is a module for obtaining information on operation of the vehicle output from the speed sensor, an acceleration sensor, and so on. The operation-information obtaining section 210*c* outputs information that is used by the route guidance section 210*b*, as described above, and also outputs information for generating the history information. That is, in the present embodiment, since the probe information indicates a speed, an amount of time required for travel through the link, and time when the vehicle traveled through the link is associated with each link, the operation-information obtaining section 210*c* determines a link shown on the map and specified by the route guidance section 210*b* and the speed and the time when the vehicle traveled through the link to generate the probe information. The history-information transmitting section 210*d* is a module for transmitting the generated probe information. That is, by controlling the communication unit 220, the history-information transmitting section 210*d* communicates with and transmits the probe information to the road-information generating apparatus 10.

(2) Road-Information Generation Method

Figure 2:
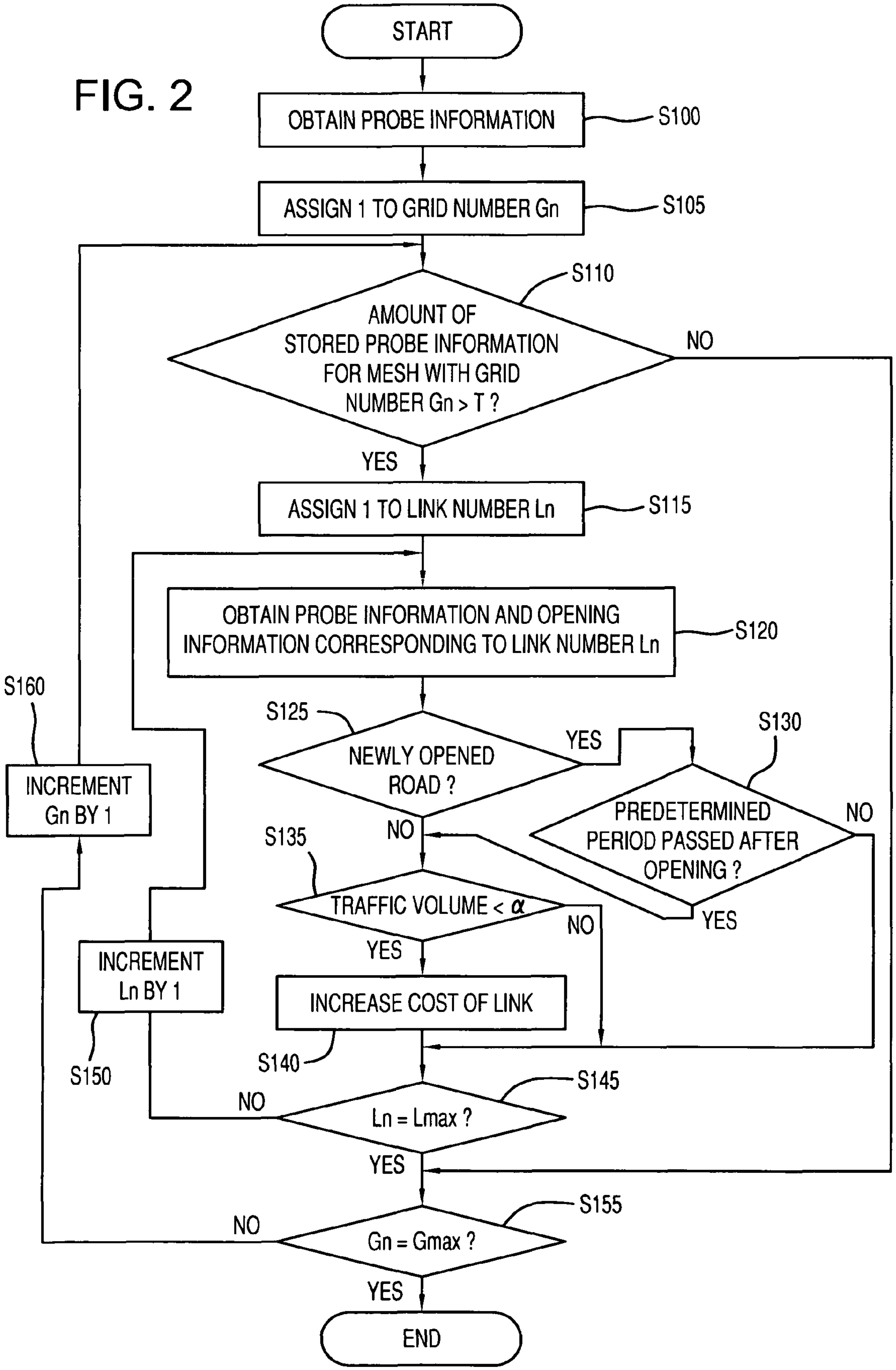
FIG. 2 is a flowchart of a road-information generation method in accordance with the present invention.

A preferred embodiment of the method of the present invention, in the form of a routine executed by the road-information generating apparatus 10, will now be described with reference to FIG. 2. FIG. 2 is a flowchart of a routine that is periodically executed by the history-information obtaining section 21*b*, the traffic-volume-information obtaining section 21*c*, and the road-selection-information generating section 21*d* of the road-information generating apparatus 10. In the present embodiment, the routine differs for each season (e.g., for each of the four seasons, i.e. spring, summer, fall, winter). In execution of the routine, the history-information obtaining section 21*b* first obtains the probe information from the storage medium 30 (in step S100).

Next, in order to initialize the routine, the traffic-volume-information obtaining section 21*c* assigns "1" as the grid number Gn (in step S105). In the present embodiment, the grid number ranges from the initial value "1" to a maximum value Gmax. In this case, since it is sufficient that grid units (map or geographic units) be unambiguously identified, the grid units may be identified in various manners, for example, by serial numbering.

In order to evaluate the traffic volume of a link based on the probe information accumulated and stored in at least the predetermined amount, the traffic-volume-information obtaining section 21*c* determines whether or not the amount of the stored probe information for a grid unit with the mesh number Gn is greater than or equal to a predetermined amount T (in step S110). Thus, since the probe information is information in which the vehicle speed and the time are associated with each link, the traffic-volume-information obtaining section 21*c* identifies links included in the grid unit with the grid number Gn by referring to the map information 30*c*. The traffic-volume-information obtaining section 21*c* then extracts the probe information corresponding to links included in the grid unit (with the grid number Gn) from the probe information obtained by the history-information obtaining section 21*b*, and compares the amount of the extracted probe information with the predetermined amount T.

When it is determined in step S110 that the amount of the stored probe information corresponding to the links included in the grid unit with grid number Gn is not greater than or equal to the predetermined amount T, the road-information generating program 21 skips steps S110 to S150. The predetermined amount T of history information which serves as a reference for obtaining the traffic-volume information may be defined in various manners. For example, the predetermined amount T may be the amount of information pre-stored to the extent that the difficulty of passage is indicated by traffic volume, may be different amounts defined for each specific period such as the four seasons, may be different amounts defined for each specific zone such as a grid unit, or may be defined according to the number of roads in a zone.

When it is determined in step S110 that the amount of the stored probe information, corresponding to the links included in the grid unit with the grid number Gn, is greater than or equal to the predetermined amount T, the traffic-volume-information obtaining section 21*c* assigns "1" to link number Ln to initialize the link number Ln (in step S115), in order to process each link included in the grid unit with the grid number Gn. The link number Ln is defined serially, from the initial value "1" to a maximum value Lmax. The maximum value Lmax corresponds to the number of links included in the grid unit with the grid number Gn. In this case, since it is sufficient that the links be unambiguously identified, the links may be identified in various manners, for example, with serial numbers assigned to the links.

Next, the traffic-volume-information obtaining section 21*c* extracts probe information corresponding to the link number Ln from the probe information obtained by the history-information obtaining section 21*b* and also obtains opening information corresponding to the link number Ln (in step S120). Based on the opening information, the traffic-volume-information obtaining section 21*c* determines whether or not a road corresponding to the link number Ln is a newly opened road (in step S125). When it is determined in step S125 that the road corresponding to the link number Ln is a newly opened road, the traffic-volume-information obtaining section 21*c* further determines whether or not a predetermined period (e.g., six months) has passed after the opening of the road (in step S130).

When it is determined in step S125 that the road corresponding to the link number Ln is not a newly opened road or it is determined in step S130 that the predetermined period has passed, step S135 is executed, based on an assumption that a determination as to whether or not it is difficult to pass through the road can be made. That is, the traffic-volume-information obtaining section 21*c* extracts the probe information corresponding to the link number Ln from the probe information obtained by the history-information obtaining section 21*b*, and obtains the traffic volume of the link with the link number Ln during a predetermined period, based on the vehicle travel speed recorded in the probe information. The road-selection-information generating section 21*d* determines whether or not the traffic volume is smaller than a predetermined reference value $\alpha$ (e.g., a rate, such as one vehicle per day or multiple vehicles per day) (in step S135).

When it is determined in step S135 that the traffic volume is smaller than the predetermined reference value $\alpha$, the road-selection-information generating section 21*d* refers to the map information 30*c* to obtain existing link-cost information associated with the link number Ln and increases that link-cost in information 30*b* (in step S140). When it is determined in step S135 that the traffic volume is not smaller than the predetermined reference value $\alpha$, the process skips step S140. Thus, the cost of the link with the link number Ln does not change from the previous cost. On the other hand, when it is determined in step S130 that the predetermined period has not passed after the opening of the road associated with the link number Ln, the process skips steps S135 and S140. Thus, the cost of the link number Ln does not change from the previous cost.

After the above-described processing for link number Ln, the control unit 20 determines whether or not the link number Ln has reached the maximum value Lmax (in step S145). When it is determined that the link number Ln has not reached the maximum value Lmax, the control unit 20 adds an increment to the link number Ln (adds in step S150) and repeats step S120 and the subsequent steps for link number $L_{n+1}$.

When it is determined in step S145 that the link number Ln has reached the maximum number Lmax, the road-information generating program 21 determines whether or not the grid unit number Gn has reached the maximum value Gmax (in step S155). When it is determined that the grid unit number Gn has not reached the maximum value Gmax, the control unit 20 increases the grid unit number Gn by an increment of "1" (in step S160), and repeats step S110 and the subsequent steps for grid unit $G_{n+1}$. As a result of the above-described processing, the travel difficulty that varies for each season is reflected in the link-cost information 30*b* used for route searching. Transmission of the link-cost information 30*b* to the navigation apparatus 100 makes it possible to provide route guidance for the vehicle in which the navigation apparatus 100 is installed, while avoiding a route that is difficult for the vehicle to travel (pass through).

(3) Operation of the Navigation Apparatus

Figure 3:
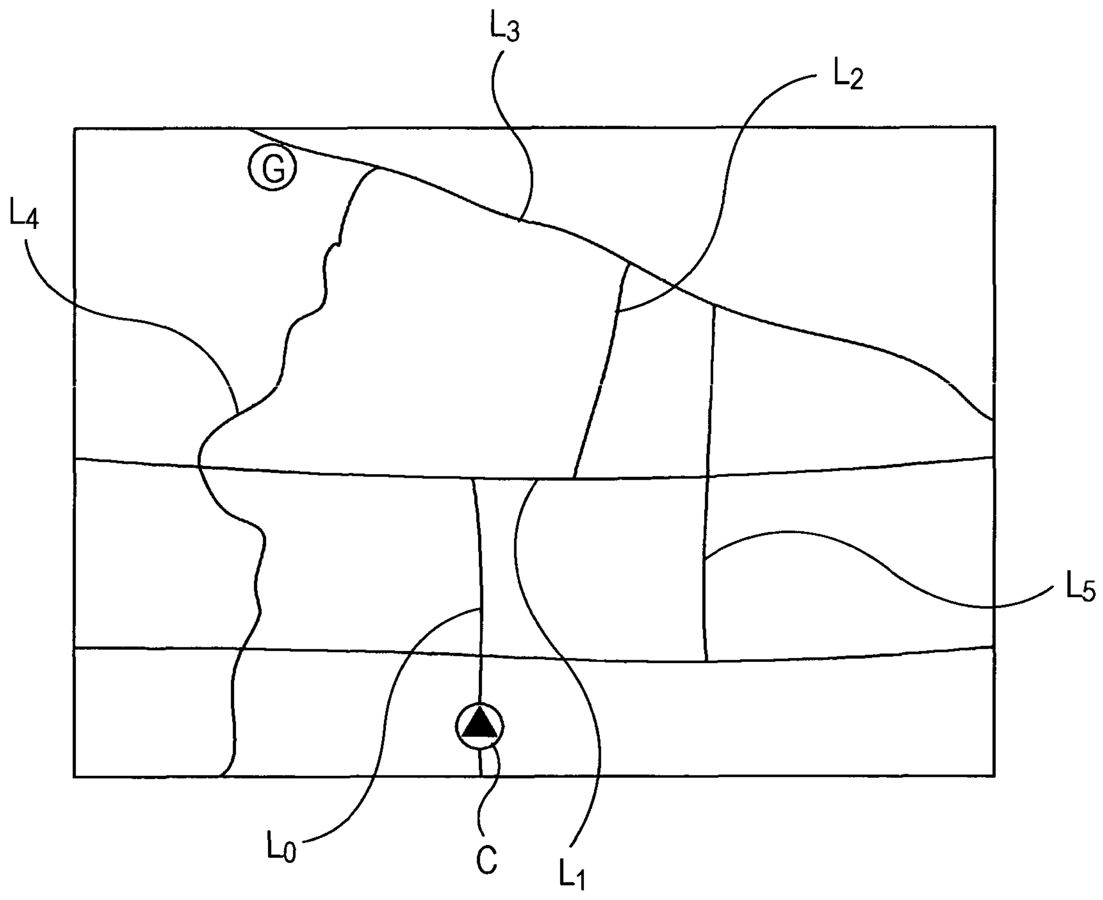
FIG. 3 is a diagram of an example of a screen displayed by the navigation apparatus.

A route guidance operation using the above-described link-cost information 30*b* will now be described with reference to FIG. 3. FIG. 3 shows an example of a screen displayed on a display unit (not shown) included in the navigation apparatus 100. In FIG. 3, a mark C, in the form of a black triangle surrounded by a circle, indicates current vehicle location, a mark with character G surrounded by a circle indicates a destination, and the lines indicate roads.

During a search for a route from the current location denoted by the mark C to the destination, the route guidance section 210*b* typically selects links $L_0$, $L_1$, $L_2$, and $L_3$, the route guidance section 210*b* searches for a route based on only existing link-cost information that has not been updated with the link-cost information 30*b*. However, when information indicating that the links $L_0$, $L_1$ and $L_2$ are congested is obtained through communication, the cost of each of the links $L_0$, $L_1$, and $L_2$ is increased and these links are excluded from routes to be selected by the route search.

In the latter case, an alternative route to the destination is searched for. For example, when a road corresponding to a link $L_4$ is a mountain road and is not available in wintertime, the road-selection-information receiving section 210*a* executes a routine for receiving the link-cost information 30*b*, that corresponds to the link $L_4$ and that has an increased cost, and for writing the received link-cost information 30*b* into the storage medium 300 before performing the route search. The link $L_4$ that is not available in wintertime is less likely to be included in routes obtained by the alternative-route search.

Instead of the link $L_4$, another available link, for example, link $L_5$, will be designated as a route determined by the route search.

(4) Other Embodiments

The above-described embodiment is but one example of the present invention and various changes and modifications can be made thereto, as long as the traffic-volume information is obtained based on the history information that has been accumulated and stored in at least the predetermined amount and the road-selection information for avoiding a road can be generated when the traffic volume of the road during a predetermined period is smaller than a predetermined reference value, indicating difficulty in travel. Various configurations of the road-selection information may be employed by the navigation apparatus 100. For example, the present invention is applicable to a configuration in which a route from a current position to a destination is found by search before the start of traveling, to a configuration in which a route is dynamically searched for during travel, and to a configuration in which, even when a route to a destination is not being searched, a route to be taken forward in continued travel is predicted. Thus, the present invention, applied to any such configuration, generates information for avoiding sections ahead, on the route located by search or predicted, which would likely be difficult to travel.

The method for collecting the history information is not limited to communication with the vehicle. For example, an optical beacon, an ultrasonic vehicle sensor, a loop-coil vehicle sensor, or the like may be used to obtain, as the history information, information indicating the travel state of the vehicle on a road. In addition, the method for obtaining the history information may be implemented by various types of communication, such as wireless communication, as described above, or cable communication utilizing various infrastructures. Further, the information that is recorded in a storage medium as the history information may be automatically or manually collected.

In addition, the predetermined period for evaluating the traffic volume may be predetermined in accordance with a road condition to be avoided. For example, when the difficulty of travel on a road varies with season, the season can be set as the aforementioned period, or when the number of pedestrians on a road varies depending on time of day and/or day of week and/or holiday, the period may be determined in accordance with variation in the number of pedestrians.

The predetermined reference value set for the traffic volume in order to determine whether or not it is difficult to travel (pass through) a road may be a fixed value, as in the above-described embodiment, or may be a value that varies in accordance with the time period or zone. For example, the predetermined reference value may be a rate, such as one vehicle per certain period or multiple vehicles per certain period.

The road-selection information for avoiding a road may be information for reducing the possibility that a road to be avoided will be included in the routes obtained by route search, in the same manner as the above-described link-cost information, or may be information directly indicating a road to be avoided. When the cost of a link is to be increased, the cost may be set higher than a previously set cost, as described above, or may be set higher than the costs of neighboring roads.

Although a zone that is referred to as a "grid unit" is used as a processing unit in the above-described embodiment, the zone may be otherwise set, as long as it includes at least a first road and a second road that serves as a candidate for detouring the first road. For example, the zone may be a prefecture, a municipal division, or the like. The road-selection information communicated to a vehicle may vary for different zones. For example, the zone in the present invention may be an area in the vicinity of the home of the driver of the vehicle, an area in the vicinity of a route that is often used, or the like.

Since the predetermined amount of history information is set to be sufficient to allow the difficulty of passing through a road to be determined based on the traffic volume, a configuration for indirectly determining whether or not the history information has been accumulated to a degree that the difficulty of passing through a road can be determined based on the traffic volume may be used for indirectly defining the predetermined amount of information.

As an example of a scheme for indirectly defining the predetermined amount, a rate of change in the amount of the stored history information for multiple roads included in a zone preset on a map may be referred to. That is, when the obtaining of history information is started and continuously performed, the rate of change varies in accordance with the amount of the stored history information, and when the amount of the stored history information increases, the rate of change decreases. Thus, making a determination as to whether or not the rate of change in the amount of the stored history information is lower than a predetermined reference makes it possible to indirectly determine whether or not at least the predetermined amount of history information has been accumulated and stored.

Accordingly, when the amount of a change in the amount of history information relative to time is smaller than a predetermined reference value, the traffic-volume information is generated and a determination as to whether or not the traffic volume is smaller than the predetermined reference value, indicating the difficulty of passage, is made with respect to roads included in the zone. As a result, it is possible to reliably evaluate the difficulty of passing through the roads included in each zone. The zone in this case may also be set in various manners, similarly to the zone described above. The rate of change in the amount of the stored history information may be a ratio of a numerator and a denominator that represent amounts of stored history information. For example, the rate of change may be defined as the ratio of an amount of stored history information during an immediately preceding predetermined period to a total amount of stored history information ("first ratio"). Alternatively, the arrangement may be such that the amounts of stored history information in respective predetermined periods are aggregated and the ratio of the amount of stored history information during one predetermined period to the amount of stored history information during a next predetermined period ("second ratio") is defined as the rate of change.

In the first ratio, the total amount of stored history information, the total amount serving as a denominator, increases as the history information is continuously stored. Thus, when at least the predetermined amount of history information has been stored and accumulated, the ratio of the amount of history information stored during a certain period to the total amount of history information falls to a predetermined reference value or less. Accordingly, presetting the reference value for the rate of change in the ratio of the amount of history information stored during a certain period to the total amount of stored information makes it possible to determine whether or not the rate of change is smaller than the predetermined reference value. This also makes it possible to indirectly determine whether or not the history information has been stored in at least the predetermined amount.

The second ratio is an indicator reflecting the amount of penetration by the history-information providing apparatuses (e.g., navigation apparatuses). That is, the absolute number of history-information providing apparatuses is small in an initial stage of the penetration. In a stage of rapid penetration, however, when the amount of stored history information during a certain predetermined period and the amount of history information stored during a next predetermined period are compared with each other, the amount of history information stored during the next predetermined period becomes larger than the amount of history information stored during the certain period. On the other hand, when the absolute number of history-information providing apparatuses has become large, the amount of history information stored during the certain period and the amount of history information stored during the next predetermined period become almost equal to each other. That is, the rate of change defined as the ratio of the amount of history information stored during a certain period to the amount of history information stored during a next predetermined period converges to a specific value. Thus, a reference value may be preset for the rate of change in the ratio of the amount of history information stored in a certain predetermined period to the amount of history information stored in a next predetermined period. With this arrangement, making a determination as to whether or not the rate of change is smaller than the predetermined reference value makes it possible to determine whether or not a required number of history-information providing apparatuses has traversed a link and the history information has been stored in at least the predetermined amount.

A configuration for indirectly determining whether or not the history information has been stored in at least the predetermined amount is not limited to the above-described configuration. For example, the navigation apparatuses installed in vehicles may obtain home information indicating locations of the homes of the drivers of the vehicles. With this arrangement, when the number of locations of homes in a zone preset for a map zone exceeds a predetermined reference number or when change in the number of locations of homes, the number of locations being aggregated at predetermined intervals, is smaller than a predetermined reference number, processing to generate the road-selection information for roads included in the zone may be executed, based on an assumption that the history information has been stored in at least the predetermined amount. Alternatively, with respect to roads included a zone preset on a map, when the ratio of the number of links associated with history information to the number of all links exceeds a predetermined reference value or the amount of change in the ratio relative to time is smaller than a predetermined reference value, processing to generate the road-selection information for roads included in the zone may be executed, based on an assumption that the history information has been stored in at least the predetermined amount.

In addition, the opening information for determining whether or not a road is newly opened may be included in the probe information, as described above, or may be collected as information that is independent from the information transmitted from the navigation apparatus 100. The processing to determine whether or not a road is a newly opened road is not limited to steps S125 and S130 described above. For example, the arrangement may be such that road-opening date is obtained and a determination is made as to whether or not at least the predetermined amount of time has passed since the obtained opening date. In addition, the road-information generating apparatus may be located in an information center that collects a large amount of information for a large number of areas and that processes the information, or may be installed in a vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A road-information generating apparatus for providing road-selection information to a navigation apparatus of at least one road-selection information receiving vehicle, comprising:

a history-information generating section which obtains probe information transmitted from a respective navigation apparatus mounted in at least one probe information-transmitting vehicle, which correlates the obtained probe information with links defined by map information stored in a storage medium to generate history information indicating history of vehicle travel on a road, and which accumulates and stores the generated history information to obtain accumulated and stored history information;

a traffic-volume-information obtaining section which obtains traffic-volume information indicating a traffic volume on each road included in a zone preset on a map for which the amount of the accumulated and stored history information exceeds a predetermined amount, wherein said traffic volume is a number of vehicles on the road per unit time;

a road-selection-information generating section which takes into account the traffic volume on each said road included in the zone for which the amount of the accumulated and stored history information exceeds the predetermined amount to generate road-selection information for avoiding at least one of the roads included in said zone for which the amount of the accumulated and stored history information exceeds the predetermined amount and that is ahead of the at least one road-selection information receiving vehicle, said generating section indicating difficulty of passage when the obtained traffic volume on the at least one of the roads included in said zone for which the amount of the accumulated and stored history information exceeds the predetermined amount and that is ahead of the at least one road-selection information receiving vehicle during a predetermined period is smaller than a predetermined reference value, taking into account the traffic-volume information for other roads in said zone for which the amount of the accumulated and stored history information exceeds the predetermined amount; and a communication unit which receives the probe information transmitted from the navigation apparatus mounted in the at least one probe information transmitting vehicle, and which transmits the road-selection information to the navigation apparatus of the at least one road-selection information receiving vehicle.

2. The road-information generating apparatus according to claim 1, wherein the road-selection information comprises link information for a link constituting the road and cost information indicating a cost for the link, and wherein, when the traffic volume on the link is smaller than the predetermined reference value, the road-selection-information generating section increases the cost for the link.

3. The road-information generating apparatus according to claim 1, wherein the road-selection-information generating section determines, for each season, whether or not the traffic volume is smaller than the predetermined reference value.

4. The road-information generating apparatus according to claim 1, wherein the traffic-volume-information obtaining section which obtains opening information indicating when the road was opened to traffic, and when a predetermined period of time has passed after opening of the road, the traffic-volume-information obtaining section which obtains the traffic-volume information for the road.

5. A navigation apparatus comprising:
the road-information generating apparatus according to claim 1, further comprising:
a travel-plan-route information section which obtains the road-selection information transmitted from the transmitting means and which obtains travel-plan-route information indicating a travel plan route that avoids the road whose traffic volume is smaller than the predetermined reference value, based on the obtained road-selection information.

6. A road-information generating method comprising:
receiving, at a communication unit, probe information transmitted from a navigation apparatus mounted in a first vehicle;
utilizing a control unit, correlating the received probe information with links defined by map information stored in a storage medium to generate history information to obtain generated history information;
accumulating and storing, in a storage medium, the generated history information until at least a predetermined amount of history information is stored to obtain accumulated and stored history information;
obtaining, in the control unit, traffic-volume information indicating traffic volume on each road included in a zone preset on a map for which the amount of the accumulated and stored history information is at least the predetermined amount, wherein said traffic volume is a number of vehicles on a respective road per unit time;
determining, utilizing the control unit, whether or not a traffic volume on each of the roads included in said zone for which the amount of the accumulated and stored history information is at least the predetermined amount and that is ahead of the vehicle during a predetermined period is smaller than a predetermined value indicating difficulty of passage; and
generating, with the control unit, road-selection information for avoiding at least one road included in said zone for which the amount of the accumulated and stored history information is at least the predetermined amount and that is ahead of a second vehicle, responsive to a determination that the traffic volume on the at least one road included in said zone for which the amount of the accumulated and stored history information is at least the predetermined amount and that is ahead of the second vehicle during the predetermined period is smaller than the predetermined reference value and taking into account the traffic-volume information for other roads in said zone for which the amount of the accumulated and stored history information is at least the predetermined amount; and
transmitting, with the communication unit, the road selection information to the navigation apparatus of the second vehicle.

7. The road-information generating method according to claim 6, wherein the road-selection information comprises link information for a link constituting the road and cost information indicating a cost for the link, and wherein, when the traffic volume on the link is smaller than the predetermined reference value, the road-selection-information generating means increases the cost for the link.

8. The road-information generating method according to claim 6, wherein, responsive to a determination that a rate of change in the amount of stored history information for roads included in a zone preset on a map is smaller than a predetermined reference value, the traffic-volume-information is obtained and the road-selection-information is generated.

9. The road-information generating method according to claim 6, wherein the determination of whether or not the traffic volume is smaller than the predetermined reference value is made for each of the four seasons.

10. The road-information generating method according to claim 6, further comprising obtaining road opening information indicating when the road was opened to traffic, and when a predetermined period of time has passed after opening of the road, obtaining the traffic-volume-information for the road.

11. A navigation method utilizing the road-information generating apparatus according to claim 1 and a navigation apparatus in the at least one vehicle, the method comprising:
transmitting the road-selection information from the information generating apparatus;
obtaining, by operation of the navigation apparatus, the transmitted road-selection information; and
obtaining, by operation of the navigation apparatus, travel-plan-route information indicating a travel plan route that avoids the road whose traffic volume is smaller than the predetermined reference value, based on the obtained road-selection information.

12. A non-transitory computer-readable medium having encoded thereon a road-information generating program for causing a computer to implement:
obtaining probe information transmitted from a navigation apparatus mounted in a first vehicle;
correlating the obtained probe information with links defined by map information stored in a storage medium to obtain generated history information;
accumulating and storing the generated history information until at least a predetermined amount of history information is stored to obtain accumulated and stored history information;
obtaining traffic-volume information indicating traffic volume on each road included in a zone preset on a map for which the amount of the accumulated and stored history information is at least the predetermined amount, wherein said traffic volume is a number of vehicles on a respective road per unit time; and
generating, by taking into account the traffic volume information on a road in said zone for which the amount of the accumulated and stored history information is at least the predetermined amount and that is ahead of a second vehicle and also the traffic-volume information for other roads in said zone for which the amount of the accumulated and stored history information is at least the predetermined amount, road-selection information for avoiding the road in said zone for which the amount of the accumulated and stored history information is at least the predetermined amount and that is ahead of the second vehicle when the traffic volume of the road in said zone for which the amount of the accumulated and stored history information is at least the predetermined amount and that is ahead of the vehicle during a predetermined period is smaller than a predetermined reference value indicating a difficulty of passage.

13. A road-information generating apparatus for providing road-selection information to a navigation apparatus of at least one road-selection information receiving vehicle, comprising:

history-information generating section which obtains probe information transmitted from a respective navigation apparatus mounted in at least one probe information transmitting vehicle, which correlates the obtained probe information with links defined by map information stored in a storage medium to obtain generated history information, and which stores and accumulates the generated history information to obtain accumulated and stored history information;

traffic-volume-information obtaining section which obtains traffic-volume information indicating respective traffic volumes on roads included in a zone preset on a map when a rate of change in an amount of the accumulated and stored history information for the roads included in the zone preset on a map is smaller than the predetermined reference value, wherein each said traffic volume is a number of vehicles on the respective said road per unit time;

a road-selection-information generating section which generates road-selection information for avoiding one of said roads included in the zone preset on the map when a rate of change in an amount of the accumulated and stored history information is smaller than the preset value and that is ahead of the at least one road-selection information receiving vehicle when the obtained traffic volume on the road ahead of the road-selection information receiving vehicle during a predetermined period is smaller than a predetermined reference value indicating difficulty of passage; and a communication unit which receives the probe information transmitted from the at least one probe information transmitting vehicle and which transmits the road-selection information to navigation apparatus of the at least one road-selection information receiving vehicle.

14. The road-information generating according to claim 1 wherein the zone is area including at least a first road and a second road that serves as a candidate for detouring the first road and is a map grid unit, a state or a municipal division.

15. The road-information generating method according to claim 6 wherein the zone is area including at least a first road and a second road that serves as a candidate for detouring the first road and is a map grid unit, a state or a municipal division.

* * * * *